Patented Oct. 15, 1940

2,217,904

UNITED STATES PATENT OFFICE 2,217,904

ALKYL ETHERS OF CELLULOSE

Frederick C. Hahn, Upper Montclair, N. J., assignor to E. I. du Pont de Nemours & Company, Wilmington, Del., a corporation of Delaware No Drawing. Application March 22, 1938, Serial No. 197,375

4 Claims. (Cl. 260—231)

This invention relates to cellulose ethers, and more particularly to the preparation of alkali cellulose and its treatment with etherifying agents.

The usual method of preparing cellulose ethers comprises the formation of alkali cellulose (a compound, composition or intimate mixture of alkali, cellulose and water), and treatment of the same with an etherifying agent. This process has been the subject of myriad scientific investigations, and many variations of the process have been proposed by investigators.

In general, all such processes for the preparation of alkali cellulose may be divided into two classes, to wit: those in which important proportions of an inert diluent are employed, and those not employing such a material. The present invention especially appertains to the former of these classes. In order to emphasize the advance in the art herein disclosed, attention is directed to the apparently more important of the previously known processes of this class, which are:

1. The grinding of cellulose with solid caustic alkali in benzene (United States Patent 1,501,207);

2. The grinding of cellulose to a powder and the stirring of the same into a slurry of solid caustic alkali in an inert liquid, followed by the addition of the required amount of water (United States Patent 1,819,600);

3. The treatment of cellulose with an excess of caustic alkali solution and removal of the said excess by pressing, followed by the addition of a slurry of solid caustic alkali in an inert diluent, the amount of solid caustic alkali being sufficient to give the alkali cellulose the required alkali content (United States Patent 2,010,818).

A demand for cellulose ethers having clarity and color superior to that of the products prepared by previously described processes, has constantly been recognized. The preparation of good quality organic solvent soluble cellulose ethers, especially those capable of forming a film of a high degree of transparency, seems to require the uniform distribution in the starting cellulose of a comparatively small proportion of water and a comparatively large proportion of caustic alkali (more than will dissolve at normal or ordinary room temperatures in the amount of water present during etherification).

Research has indicated that expedients (previously proposed in the art) such as the treatment of cellulose with concentrated caustic alkali at high temperatures or for extended periods of time, detrimentally affect the properties of the cellulose ether produced.

This invention had for an object the provision of an improved and simplified process for the preparation of alkali cellulose of a high degree of uniformity and other properties rendering the same suitable for use as an intermediate for the preparation of high quality cellulose ethers. Other objects were the preparation of improved cellulose ethers and improved alkali cellulose while avoiding those methods which, in the prior art, have been found to cause injury to the starting cellulose and to affect deleteriously the quality of the final product, e. g., subjecting the starting cellulose to injury by oxidation in the presence of caustic alkali, steeping (with attendant pressing and shredding) the starting cellulose in caustic alkali solution, grinding the starting cellulose in the presence of caustic alkali or otherwise, subjecting the starting cellulose to contact with concentrated caustic alkali solutions for extended periods of time, and subjecting the starting cellulose to contact with concentrated caustic at high temperatures. Still further objects were to provide an improved method of preparing alkali cellulose of low water and high caustic alkali content capable of etherification to give improved organic solvent soluble cellulose ethers having an exceptionally high degree of uniformity and especially suitable for the production of films of high transparency, and the preparation of an alkali cellulose which is not highly degraded or oxidized. A general advance in the art and other objects which will appear hereinafter are also contemplated.

It has now been found that an alkali cellulose, capable of giving an exceptionally high quality cellulose ether (upon reaction with an etherifying agent), is obtainable by wetting cellulose with an inert diluent and thereafter treating the same below the temperature of etherification in the presence of the etherifying agent with a strong caustic alkali solution. More specifically, it has been found that the presence of ethyl chloride (or other etherifying agent which does not react with cellulose or alkali cellulose at the temperature of formation of alkali cellulose) during the treatment with a strong caustic alkali solution of cellulose previously wet with benzene (or equivalent inert diluent) gives a superior alkali cellulose which in turn gives a superior cellulose ether. The preferred modes of operation include (1) stirring granulated cellulose and the etherifying agent into an emulsion or dispersion of strong caustic alkali solution in benzene (the benzene being the outside phase so that the cellulose is wet with the benzene before contact with the caustic alkali solution), and (2) mixing cellulose wet with benzene and etherifying agent with strong caustic alkali solution.

Cellulose ethers of exceptionally high quality are prepared by heating to etherification temperature the mixture of cellulose, caustic alkali, inert diluent and etherifying agent obtained in accordance with the above, and continuing said heating until the reaction is complete.

From the following description and specific examples, in which are disclosed certain embodiments of the invention as well as details of what is believed to be the best mode for carrying out the invention, it will be apparent how the foregoing objects and related ends are accomplished. The quantities are given in parts by weight throughout the application.

*Example I*

Air dried granulated pulp board (75 parts) and benzene (396 parts) were introduced into an autoclave, the autoclave closed and ethyl chloride (243 parts) pumped in. While agitating the mixture, the temperature was raised to about 70° C. Over a period of one hour a concentrated solution of caustic alkali made by dissolving 175 parts of sodium hydroxide in 83 parts of water was forced into the closed autoclave containing the cellulose-benzene-ethyl chloride mixture while maintaining a temperature of 70°–80° C. During this addition the mixture was continuously agitated and the temperature was maintained at 70° C. to avoid separation of caustic from the solution. The resulting suspension of alkali cellulose in benzene and ethyl chloride was heated with agitation to about 150° C. The agitation of the mixture was continued at this temperature for about 7 hours. The ethyl cellulose thus prepared was isolated in the manner well known in the art. The isolated product was a white granular solid, and when dissolved in 80–20 toluene-ethanol or when cast from such a solution in the form of a film, was of a high degree of clarity and free from color and insoluble fibers. It could be used directly for safety glass interlayers and transparent plastics, it being more suitable for this purpose than cellulose ethers prepared by previously known methods.

*Example II*

Caustic soda (177 parts), water (83.5 parts) and benzene (396 parts) were charged into an autoclave. The mixture was heated to 65° C. and agitated until all the caustic alkali dissolved in the water. As a result there was obtained a two-layer system consisting of a very concentrated sodium hydroxide solution under benzene. Agitation was discontinued and 75 parts of granulated wood pulp board added to the open vessel, after which the autoclave was closed and 243 parts of ethyl chloride introduced by pumping. Agitation was resumed and the resultant mass was heated at 65°–90° C. for 2 hours. Under these conditions there is no significant hydrolysis of the ethyl chloride, which is therefore considered stable in the reaction mixture. The temperature was then raised to 150° C. and the agitation at that temperature continued for 6 hours. The resulting ethyl cellulose was isolated from the reaction mixture and purified by known methods. The ethyl cellulose thus produced when brought into the form of a film had such high transparency and freedom from color that it could be used directly for safety glass interlayers. A similar product was obtained by a procedure identical with the above, except that the two-layer system was agitated while the granulated pulp board was being introduced, care being taken, of course, to insure the cellulose being wetted with the benzene before it could absorb any of the caustic solution.

*Example III*

Seventy-five (75) parts of cellulose pulp chips (or granules) were air dried and introduced into an autoclave with 396 parts of benzene and 243 parts of ethyl chloride. The mixture was heated to 70° C. with agitation. The agitation was stopped, and while maintaining the temperature of 70° C., 175 parts of caustic soda dissolved in 83 parts of water were added. Agitation was resumed for a period of 1 hour to obtain an intimate premixture of the caustic soda with the cellulose. There resulted a suspension of alkali cellulose in benzene and ethyl chloride. The temperature was raised to 150° C. with agitation. Stirring at this temperature was continued for 7 hours. The ethyl cellulose thus prepared was isolated from the by-products of the reaction by known methods, for example, that of United States Patent 1,990,904. A similar product was obtained by a procedure identical with the above except that the two-layer system was agitated while the granulated pulp board was being introduced. The ethyl cellulose thus obtained was of excellent quality.

*Example IV*

One hundred and seventy-four (174) parts of flake caustic alkali were dissolved in 352 parts of 50% caustic alkali solution at about 70° C. This solution was added to 792 parts of benzene in an autoclave, whereupon two layers were formed with the benzene constituting the upper layer. One hundred and forty (140) parts of granulated high alpha cellulose and wood pulp board containing 0.5% of sodium isobutyrate were added, the autoclave closed, and 434 parts of ethyl chloride forced in. Agitation was started and continued at 70°–90° C. until the inert diluent was substantially free from caustic solution, i. e., clear, and the caustic solution was uniformly distributed throughout the cellulose. To effect this result, from 15 minutes to 1 hour is ordinarily sufficient. The resulting mixture was agitated and heated for 6 to 10 hours at 135°–165° C. The reaction mixture consisted of a solution of ethyl cellulose in benzene, alcohol (a by-product) and diethyl ether, in which were suspended fine crystals of salt and excess caustic alkali solution. The use of diethyl ether in the place of the benzene as the diluent is of interest because it can be recovered at the same time as the by-product ether just mentioned. If the mixture is to be filtered, water is added to dissolve the salt, but ordinarily this treatment is omitted. The mixture was run into water at 70° C. to 90° C. to remove the volatile solvents, to precipitate the ethyl cellulose, and to dissolve the inorganic materials present. After the volatile solvents were removed, the crude ethyl cellulose remained as a finely divided solid suspended in the alkaline salt residual liquor. The ethyl cellulose was filtered; was washed free of most of the alkali and salt by several treatments with water; was treated with dilute acid (sulfuric, hydrochloric, nitric, acetic, etc.) to neutralize the remaining alkali and to remove insoluble inorganic materials; was washed with water to remove most of the acid; was treated with a dilute solution of alkali or ammonia to neutralize the remaining trace of acid; was washed with water, and finally dried. The product dissolved in toluene-alcohol and many other organic solvents. The solutions were characterized by a high degree of clarity and the substantial absence of color.

*Example V*

Two hundred and thirty-six (236) parts solid caustic soda, 119 parts of water, 560 parts of benzene, and 1 part of benzyl ethyl cellulose were mixed at about 70° C. to produce an emulsion of caustic soda solution in benzene. To the emulsion was then added 100 parts of granulated wood pulp board, the autoclave closed, 180 parts of ethyl chloride pumped in, and the mixture agitated for 1 hour at 70°–90° C. One hundred and ninety (190) parts of benzyl chloride were then pumped in and the resulting mixture was agitated for 4 hours at 120° C. The temperature was gradually raised over a period of 1 hour to 135° C., and then maintained at this point for 6 hours. The resulting ethyl benzyl cellulose, when purified by the known procedures, produced smooth solutions of good clarity and freedom from usual fibers, and gave films of excellent toughness and water resistance.

*Example VI*

Caustic soda (265 parts), water (125 parts) and benzene (486 parts) were charged into an autoclave. The mixture was heated to 65° C. and agitated until all the caustic alkali dissolved in the water. As a result there was obtained a two-layer system consisting of a very concentrated sodium hydroxide solution under benzene. Agitation was discontinued and 112 parts of granulated wood pulp board containing 0.25% of sodium isobutyrate and 364 parts of ethyl chloride were added. Agitation was resumed and the resultant mass was heated at 65°–90° C. for 2 hours. The temperature was then raised to 150° C. and the agitation at that temperature continued for 6 hours. The resulting ethyl cellulose was isolated from the reaction mixture and purified by known methods. The ethyl cellulose thus produced when brought into the form of a film had such high transparency and freedom from color that it could be used directly for safety glass interlayers. A similar product was obtained by a procedure identical with the above, except that the two-layer system was agitated while the granulated pulp board was being introduced.

*Example VII*

Caustic soda (177 parts), water (83.5 parts) and benzene (396 parts) were charged into an autoclave. The mixture was heated to 65° C. and agitated until all the caustic alkali dissolved in the water. As a result there was obtained a two-layer system consisting of a very concentrated sodium hydroxide solution under benzene. Agitation was discontinued and 75 parts of granulated wood pulp board charged into the open vessel which was then closed and 200–205 parts of ethyl chloride introduced by pumping. Agitation was resumed and the resultant mass was heated at 65°–90° C. for 2 hours. The temperature was then raised to 150° C. and agitation at that temperature continued for 4–5 hours, after which 40–45 parts of ethyl chloride were added and the reaction continued for 1 to 2 hours. The resulting ethyl cellulose was isolated from the reaction mixture and purified by known methods. The ethyl cellulose thus produced when brought into the form of a film had such high transparency and freedom from color that it could be used directly for safety glass interlayers. A similar product was obtained by a procedure identical with the above, except that the two-layer system was agitated while the granulated pulp board was being introduced.

*Example VIII*

One hundred and seventy-five (175) parts of caustic soda, 83 parts of water, and 396 parts of benzene were charged into an autoclave and the mixture heated to about 70° C. with agitation, and such conditions maintained until the caustic soda had dissolved in the water. Agitation was stopped, 75 parts of air dried granulated pulp board charged into the benzene-covered caustic soda solution in the autoclave, which was then closed and 243 parts of ethyl chloride pumped in. The resultant was agitated for 1 hour at about 70° C. to obtain an intimate mixture of the cellulose and the alkali. Ethylation was then brought about by elevating the temperature to 150° C. and maintaining this temperature with continual agitation for a period of about 7 hours. The ethyl cellulose was isolated as previously described.

*Example IX*

A mixture of 175 parts of caustic soda, 83 parts of water and 396 parts of benzene was prepared in an autoclave and heated to about 70° C. with good agitation until the caustic soda had dissolved completely in the water. The mixing (agitation) was stopped and 75 parts of granulated pulp board introduced, after which the autoclave was closed and 243 parts of ethyl chloride pumped in. The resulting mixture with agitation was heated immediately to about 150° C. and maintained at this temperature for about 7 hours. The resultant ethyl cellulose was isolated in the previously described manner. In a modification of this procedure 40 parts of the ethyl chloride were withheld and added after the heating at 150° C. had continued for about 5 hours. At the end of the 7 hour heating and agitation period the ethyl cellulose was isolated as before.

Benzene is the preferred inert diluent because it has a very desirable combination of physical and chemical properties. In general any volatile organic liquid not more than slightly miscible with water (compounds not soluble in water to an extent appreciably greater than 1% at 20° C. are considered immiscible therewith) or the aqueous caustic alkali used in the etherification, inert (inactive) toward cellulose and the other ingredients of the reaction mixture under etherifying conditions and showing good stability in the presence of caustic alkali, may be employed. It is preferable that the diluent be of lower specific gravity than the caustic soda solution. In addition to benzene, toluene, low boiling gasoline, xylene, dibutyl ether, di-isobutyl ether, dibenzyl ether, and the like, special mention may be made of such other organic liquid diluents as di-ethyl ether, di-propyl ether and di-isopropyl ether.

Preferably the benzene is used in sufficient quantity to thoroughly wet the cellulose and to submerge it partly or completely This is most readily accomplished, and this procedure shows to the greatest advantage when the cellulose is used in the form of a relatively dense product such as granulated pulp board. Cellulose in the form of comparatively dense chips or granules is preferred in carrying out the invention. It has been found that definite advantages accrue from the use of granulated cellulose, for example, granulated pulp board. The apparent bulk density, size, and compactness of the individual granules are important characteristics in the selection of a cellulosic raw material. Granules of the density and character obtainable by cutting commercial pulp board into chips are especially suitable because this type of cellulose, due to its high density, is largely submerged in the diluent and reactants during the formation of the alkali cellulose and its etherification. In the production of cellulose ethers of the highest quality, it is desirable that contact of the cellulose with air (probably because of its oxygen content) be substantially avoided both during the formation of the alkali cellulose and during etherification. Although most of the air is driven out of the reaction vessel by the vapors of the benzene, the aforementioned submergence of the cellulose granules in the benzene-ethyl chloride mixture contributes materially in preventing the contact of the same with air. Cellulose granules of the type described above, and their preparation, are disclosed in detail in United States Patent 2,067,946 of January 19, 1937 to Picton.

The type of cellulose suitable for use in this invention is not limited to the cellulose chips above described or even wood pulps in general, but includes cellulose from other sources, such as cotton hulls, bagasse, ramie and flax. Regenerated cellulose from viscose, cuprammonium and other solutions may be utilized. Cellulose pretreated or modified in various ways, for example, cellulose pretreated with acids such as formic, acetic, nitric, sulfuric, or oxidizing agents and low substituted cellulose derivatives, may be used as the starting material. Low viscosity ethyl cellulose may be prepared directly from low viscosity cellulose.

The moisture content of the cellulose prior to contact with the benzene may vary somewhat, but the fiber should not contain enough water so that a film of water forms on the surface of the fibers, or so that the pulp feels damp to the touch, that is, the fiber should not contain more than about 20% moisture. The cellulose should not be sensibly wet with water or caustic soda or other aqueous solution when contacted with the benzene.

Sodium hydroxide is the preferred alkali, although any alkali metal hydroxide, for example, caustic potash, or mixtures of caustic alkalies, for example caustic potash and caustic soda, may be satisfactorily used. For convenience in describing the invention, the sodium hydroxide which has great economic advantages is usually referred to.

A novel feature of this invention is wetting the cellulose with benzene or a benzene-ethyl chloride mixture before contacting it with the caustic alkali solution, and this is applicable to any concentration of caustic alkali solution which may be used in the preparation of alkali cellulose or in the etherification of cellulose. The process of the invention shows outstanding advantages when solutions of caustic soda of 50% or greater concentrations are used. The improvement of the quality of the final cellulose ether product and other superior results are especially significant when the concentration is greater than 56%, i. e., when the solution contains more caustic soda than will dissolve at normal room temperature in the water present.

Another novel feature of this invention is the formation of the alkali cellulose in the presence of both an inert diluent and an etherifying agent. When alkali cellulose is formed in the presence of such a combination, the temperature of alkalization is maintained below the temperature of etherification but high enough to keep the alkali in solution in the water present. This makes necessary the selection of an etherifying agent that is not active at the temperature of alkalization.

The temperature at which the alkali and cellulose are mixed should be as low as convenient, consistent with the requirement that it be high enough to keep the caustic alkali in solution in the water present.

As will be clear from the examples, the wetting of the cellulose with the benzene or equivalent inert diluents may take place in various ways. Special mention may be made of the procedures in which:

1. The cellulose wet with etherifying agent is run into a vessel containing caustic soda having a supernatant layer of benzene;
2. The cellulose wet with an etherifying agent is run into a vessel containing an emulsion of caustic soda in benzene;
3. The cellulose is run into a vessel containing benzene and etherifying agent, and after wetting of the cellulose by the benzene caustic soda is run into the vessel; and
4. A mixture of benzene and etherifying agent is run into a vessel containing cellulose, and after thorough wetting of the cellulose, caustic soda solution is run into the resultant.

The additions in any of the above procedures may be carried out in the presence or absence of agitation, such as stirring.

When desired a minor portion, for example, one-sixth, of the etherifying agent may be reserved from the alkalization and added during the latter part of etherification, for example, 1 to 2 hours before the etherification is complete.

Cellulose ethers of various types may be prepared according to this invention by the selection of appropriate etherifying agents. The alkali cellulose made by the processes described herein is exceptionally suitable, probably by reason of its unusually high degree of uniformity as an intermediate for the preparation of such specific cellulose ethers as alkyl, aralkyl, alkoxyalkyl, mixed alkyl-aralkyl (for example, ethyl benzyl), and the like. The etherifying agents suitable for preparing any desired cellulose ether are well known and need not be mentioned at length, although specific mention may be made of the fact that for use in this invention etherifying agents are selected which are non-reactive toward alkali-cellulose or cellulose in the presence of alkali at the temperature which obtains during the alkali cellulose reaction. The etherifying agent should be non-reactive toward the same materials at the temperature required to dissolve the alkali in the water present, for example, when the concentration of sodium hydroxide is around 66%–68% the etherifying agent chosen should be stable in the reaction mixture at temperatures around 70° C. The ethyl chloride when present during the alkali cellulose formation, whether in excess of that required by the etherification or not, serves to make the mass more fluid, thereby making better agitation possible, and as a result there is obtained a more uniform distribution of the caustic soda throughout the cellulose. It also helps to prevent super-heating and oxidation.

In some of the examples, the caustic soda is dispersed or emulsified in the benzene, the diluent being always the outside phase. Although fine dispersions of these two immiscible liquids may be obtained simply by efficient mixing, the use of an emulsifying or dispersing assistant facilitates the production of an emulsion or dispersion. Emulsifying assistants in general may be employed, but it is preferable to use a substance which is of the same general character as the desired product, or if not of that character, one which will not involve difficulty in subsequent purification of the product. The preferred emulsifying assistants include ethyl cellulose, benzyl cellulose, butyl cellulose, gycol cellulose, cellulose glycolic acid, methyl cellulose, and the like. Special mention may be made of the alkali metal salts and long chain aliphatic acids, such as sodium oleate and the like.

In some of the examples a wetting agent, i. e., a substance inert to the reactants, soluble in the reaction mixture, and capable of: (1) effecting the equalization of the rate of absorption by the different cellulose fibers, and (2) substantial reduction of the interfacial tension between the etherifying agent and the alkali cellulose, is present. Incorporation of such substances in the cellulose (especially when dense chips are being used) prior to its mixture with the other ingredients of the reaction mass, facilitates a more even distribution of the alkali in the cellulose and gives superior results with a minimum amount of wetting agent.

Wetting agents stable (i. e., functioning as such) in alkali may in general be employed to facilitate the wetting of the cellulose by the alkali solution or emulsion thereof. The "Alkanol-M" mentioned above is a preferred reagent because it is soluble in the alkali solution. It consists of the sodium salts of acids prepared by the oxidation of the mixture of oxygenated carbon (organic) compounds obtained by the catalytic hydrogenation of carbon oxides under elevated temperatures and pressures. These acids may be obtained by processes such as those described in United States Patent 1,856,263. Salts of varying characteristics are obtained from different fractions of the acids thus obtained, and are representative of alkali stable wetting agents in general. The salts of acids of four to eight carbon atoms are considered to be particularly useful. Other substances having suitable alkali stability include sodium isobutyrate and sodium lauryl sulfate. Sodium and other alkali metal salts of sulfonated castor oils of the Turkey red oil type, of alkylated naphthalene sulfonic acids, of sulfonated petroleum, of sulfonated fish oils, etc., may be used, although somewhat less satisfactorily.

As indicated, the wetting agent may be added at various stages in and by various means to the reaction. It may be distributed in the cellulose prior to the addition of the cellulose to the reaction vessel, or may if possible and desirable be dissolved in the etherification agent prior to its addition to the reaction vessel. Other satisfactory modes of the addition include:

1. Addition separately
2. Addition as a solution in the water
3. Addition with the alkali
4. Addition in the benzene, and
5. Introduction as a solid or solution prior to the addition of the last added reactant.

In this manner the formation of the alkali cellulose and subsequent etherification are facilitated. Benefit is also obtained by incorporation of the wetting agent in the alkali cellulose prior to the addition of the etherifying agent. In the preferred embodiment of the invention, the wetting agent is used in pretreating the cellulose. The use of a wetting agent quite definitely expedites the process. For example, sodium isobutyrate in the proportion of from about .1 part up to 5 parts or even up to 10 parts per 100 parts of cellulose may be used to reduce the time required to complete the reaction (both alkali cellulose formation and ether formation). The smaller amounts of wetting agent are employed when the wetting agent is used to pretreat the cellulose, and the larger amounts when the wetting agent is added to the reactants in the etherification mixture.

The preparation of the alkali cellulose may be conducted under a wide variety of conditions as regards time and temperature. As will be clear to those skilled in the art, the conditions to be used vary with the particular cellulose raw material and other reagents used in the process.

The ingredients should be mixed for a period of time sufficient to give uniform distribution of the caustic over the cellulose. This is governed by the speed and efficiency of mixing, the size of the batch, and ordinarily takes 15 minutes or more. Usually the cellulose is mixed with the caustic alkali at a temperature of around 70° C. for a short time. However, as indicated in Example XI, this period of mixing at a low temperature may be dispensed with.

The proportions of alkali, cellulose and water may be varied, depending on the product to be prepared. For organic solvent-soluble ethyl cellulose a preferred ratio is cellulose 100 parts, water 80 to 150 parts and sodium hydroxide about one to two times the amount of water.

The etherification of the alkali cellulose may likewise be conducted under a wide variety of time and temperature conditions. The conditions used vary with the particular cellulose ether being prepared and the particular etherifying agent being used. In the preparation of ethyl cellulose using ethyl chloride as the etherifying agent, etherification reaction temperatures are preferably in the neighborhood of 150° C., reaction being continued until etherification is completed to the required degree. No advantage has been found for ethylation temperatures below 100° C. or above 170° C. Commercial scale operations would ordinarily be conducted in a much narrower range, about 150° C.

As many apparently widely different embodiments of this invention may be made without departing from the spirit and scope thereof, it is to be understood that I do not limit myself to the specific embodiments thereof except as defined in the appended claims.

I claim:

1. The process which comprises dissolving 174 parts of caustic soda in 352 parts of 50% caustic soda solution at 70° C., adding the resultant to 792 parts of benzene to form a two-layer system, adding 140 parts (dry weight basis) of granulated high alpha cellulose wood pulp board containing 0.5% of sodium isobutyrate together with 434 parts of ethyl chloride and agitating at 70°–90° C. until the benzene is clear and the caustic soda solution uniformly distributed throughout the cellulose.

2. In the process of preparing alkali cellulose by treating cellulose with concentrated caustic alkali solution in the presence of inert diluent, the improvement which comprises wetting dry cellulose with inert diluent, contacting the diluent-wet cellulose with an aqueous solution of caustic alkali of more than 50% concentration and with etherifying agent and agitating the resulting mixture at a temperature below that at which etherification takes place, thereby to provide that the alkali cellulose is formed in a reaction mixture free from solid alkali.

3. In the process of preparing alkali cellulose by treating cellulose with concentrated caustic alkali solution in the presence of inert diluent, the improvement which comprises wetting dry cellulose with inert diluent, contacting the diluent-wet cellulose with an aqueous solution of caustic alkali of more than 50% concentration and with ethylating agent, and agitating the resulting mixture at a temperature below that at which ethylation takes place, thereby to provide that the alkali cellulose is formed in a reaction mixture free from solid alkali.

4. In the process of preparing alkali cellulose by treating cellulose with concentrated caustic alkali solution in the presence of inert diluent, the improvement which comprises wetting dry cellulose with inert diluent, contacting the diluent-wet cellulose with an aqueous solution of caustic alkali of more than 50% concentration and with ethyl chloride, and agitating the resulting mixture at a temperature below that at which ethylation takes place, thereby to provide that the alkali cellulose is formed in a reaction mixture free from solid alkali and heating the resultant to ethylation temperature, thereby effecting ethylation.

FREDERICK C. HAHN.